June 29, 1943. M. L. SMITH 2,322,980
COMBINATION REFRIGERATOR AND VENDING MACHINE
Filed Jan. 16, 1940
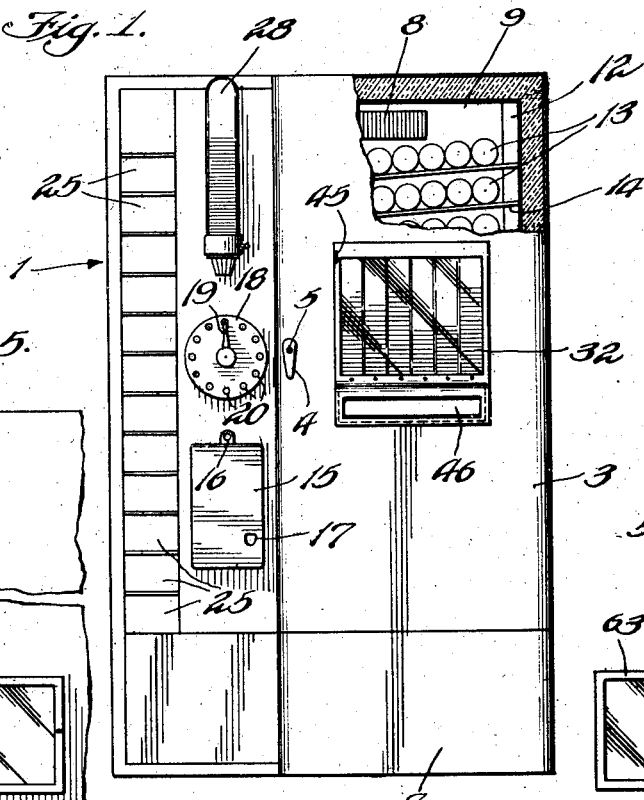

Patented June 29, 1943

2,322,980

UNITED STATES PATENT OFFICE 2,322,980

COMBINATION REFRIGERATOR AND VENDING MACHINE

Milton L. Smith, Chicago, Ill.

Application January 16, 1940, Serial No. 314,159

12 Claims. (Cl. 62—89)

This invention relates to refrigerators in general, and more particularly to refrigerated dispensing machines adapted to dispense articles, such as beverages, which must be kept comparatively cold, and articles, such as chocolate, which must be cooled but not to as low a temperature as that to which the beverages are cooled.

It is one of the objects of the present invention to provide a refrigerated beverage dispensing machine with means whereby a standard confectionery vending machine may be mounted so as to be cooled to just the requisite temperature required by the confection, even though that requisite temperature is very much above the temperature to which the beverage to be dispensed is cooled.

During the summer months, the merchandising of confectionery, such as chocolate, is rather difficult due to the need for refrigeration. The magnitude of sales of chocolate from coin controlled vending machines is generally insufficient to warrant the installation of a refrigerating unit, and therefore such machines are seldom used during the hot summer months. In accordance with the teachings of the present invention a standard coin controlled chocolate vending machine may be mounted on one of the walls of a refrigerated beverage dispensing machine, such as on the door thereof, and so arranged that the chocolate vending machine is cooled by the main refrigerating machine an amount sufficient for the maintenance of the chocolate in proper condition. This should be approximately 60°. If the chocolate is much warmer than 60° it becomes soft and difficult to handle. If the temperature of the chocolate is appreciably below 60° it tends to discolor.

It is a still further object of the present invention to provide a refrigerator, which may be of the non-vending type, for instance the ordinary domestic type refrigerator, with a compartment that is maintained at a fixed temperature below the temperature of the room but appreciably above the temperature within the main refrigerator chamber. Such compartment may be used for holding substances such as butter which, if refrigerated to the temperature required for the preservation of other food stuffs, becomes too hard to spread. In refrigerating machines heretofore provided for this purpose a butter compartment within the refrigerator is cooled by the ambient medium within the refrigerator and warmed by conduction of heat through the refrigerator wall so that the temperature within the butter compartment is somewhat above that within the rest of the refrigerator. Since the temperature outside of the refrigerator varies, the temperature within the butter compartment must also vary. This is objectionable. In another arrangement the butter compartment is mounted entirely within the refrigerator and is warmed by a thermostatically controlled electric heater. This is objectionable because it increases the load on the refrigerator. It is one of the objects of the present invention to overcome both of the above mentioned difficulties. This is accomplished, in accordance with the teachings of one embodiment of the present invention, by providing the auxiliary compartment at or near a wall of the refrigerator, and having adequate insulation to prevent excessive cooling of that compartment. In order to maintain the auxiliary compartment at the requisite temperature, regardless of how much higher the outside temperature may be, there is provided an opening for permitting cold air from the interior of the refrigerator to gravitate into the auxiliary compartment, and there is provided a thermostat responsive to the temperature within the auxiliary compartment for closing said opening when the temperature drops below a fixed value for which the thermostat has been set, say 60°. It is a further object of the present invention to provide a refrigerator with an auxiliary compartment, as above set forth, which auxiliary compartment is carried on the door of the refrigerator and is arranged to be accessible from outside the refrigerator when the refrigerator door is closed. This compartment may be used to hold confectionery, butter or the like, or, in commercial vending machines as above set forth, it may be used to hold a coin controlled chocolate or other confection vending machine.

The attainment of the above and further objects of the present invention will be apparent from the following specification taken in conjunction with the accompanying drawing forming a part thereof.

In the drawing:

Figure 1 is a front view, in partial section, of one type of coin controlled beverage dispensing machine, to which the present invention has been applied;

Figure 2 is a plan view of the machine of Figure 1, with the door open;

Figure 3 is a back view of a portion of the door of Figure 2, said view being taken along the line 3—3 of Figure 2;

Figure 4 is a partial sectional view through the door of a refrigerator illustrating another embodiment of the present invention; and Figure 5 is a fragmentary front view of the door illustrated in Figure 4.

Reference may now be had more particularly to Figure 1. At 1 is indicated a coin controlled bottled beverage dispensing refrigerator. Since the construction of the mechanism of this machine forms no part of the present invention, a description thereof at this point is unnecessary, it being merely sufficient to state that this view may represent the front of any dispensing apparatus of the above mentioned type. A suitable type of a construction is illustrated in my pending applications, Serial No. 294,103 or 294,104, to which reference may be had for a more detailed description. The refrigerator includes a thermally insulated hinged front door 3 provided with a handle 4 for opening the same, the handle being locked by a key controlled lock 5. A bottom compartment closed by a panel 7 is provided, within which an electrically operated compresser type refrigerator unit of any well known construction is located, for cooling the interior compartment of the refrigerator. Cooling coils are mounted at any convenient place within the refrigerator chamber as, for instance, at 8 within the chamber 9.

A rack 12 is mounted in the refrigerator compartment 9 of the refrigerator cabinet for receiving bottles 13 of beverages, said bottles resting on inclined slides 14 of the rack 12, as set forth more fully in my pending applications above referred to. A coin box 15 having a coin-receiving slot 16 and a coin return opening 17, which coin box is of any preferred construction as, for instance, as set forth in my above referred to applications, is located at the front of the refrigerator cabinet, to one side of the door 3 thereof. A selector 18 having a selector handle 19 movable to any one of a number of positions 20 is provided for controlling the selection of the beverage desired. Pivoted flaps 25 are provided for the delivery outlets for the different kinds of bottled beverages determined by the selector 18 under the control of the coin box 15. A paper drinking cup dispensing device 28 is also provided.

At the front side 30 of the door 3 there is provided a recess 31 within which a coin controlled confection vending machine 32, of any desired construction, may be mounted. The door includes thermal insulation 35 for preventing a too great drop in temperature of the confectionary vending machine 32. The insulation 35 may be somewhat thinner than the rest of the insulation of the refrigerator to control the temperature gradient through the door to the machine 32. The thickness of the insulation at 35 is such that when the outside temperature is above a given value, say 75°, there is insufficient cooling of the vending machine 32 by the conduction of heat through the insulation 35. To maintain the vending machine at its requisite temperature, say 60° F., the back 35' of the refrigerator door 30 is provided with one or more openings 40—41, or series of openings, which are provided with closures, indicated diagrammatically at 42, and controlled by thermostats 43. The arrangement is such that when the temperature within the vending machine 32 is above, say, 60° F. the thermostats 43 maintain the closures 42 in their open position thus permitting cold air from the interior of the refrigerator to flow through the top opening 40, by gravity, and out through the bottom opening 41. Since the temperature within the refrigerator is approximately 40° F. such flow of air results in a drop in temperature of the contents of the vending machine 32. As soon as the temperature reaches a value determined by the setting of the thermostats 43, which value may be of the order of 60° F., the thermostats close the openings 40 and prevent further movement of air. The thermostats thus regulate the temperature of the contents of the vending machine 32 and maintain it at a constant value regardless of the outside temperature.

The chocolate vending machine includes a coin receiving opening 45 and a merchandise delivery opening 46, as is well known in the art. Any standard machine may be used for dispensing different kinds of candies, chocolate, chewing gum, etc., selectively, and a description of the mechanism thereof is therefore unnecessary. The thermostats 43 and the closures 42 may be in the casing of the vending machine 32, or they may be mounted directly in the door 3.

In Figures 4 and 5 I have shown a door of a standard commercial or domestic refrigerator. The door is hinged to a refrigerator cabinet in the usual manner. At 50 is illustrated the outside exposed surface of the door and at 61 the surface of the door which is on the inside of the refrigerator. Within this door is formed a compartment 62 opening at the front side of the refrigerator and provided with a hinged closure door 63. This door 63 may include a window of glass or other transparent material, if it is desired to maintain visibility of the contents within the compartment 62. The back of the compartment 62 is thermally insulated, as indicated at 65. An air passage opening 66 is provided for establishing communication from the compartment 62 at the interior of the refrigerator cabinet, namely, to the refrigerated compartment of the refrigerator cabinet. A bi-metallic or other thermostatic element 68 controls the closure 67 for closing the opening 66. The thermostatic element may be set to maintain the opening 66 closed whenever the temperature within the compartment 62 drops below a given value for which the thermostat is set. Whenever the temperature within the compartment 62 rises above the set temperature the thermostatic element 68 opens the passageway 66 and permits the cold air from within the refrigerator to flow into the compartment 62 for cooling the same. A coin controlled vending machine for vending chocolate or other confection may be mounted within the compartment 62 with the coin and delivery chute accessible upon opening of the door 63. The door 63 is not locked but spring biased to its closed position. The door 50 may be locked. In the case of a domestic refrigerator the door 50 is not locked, and the compartment 62 may serve to hold foods, such as butter or the like.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. In combination with a refrigerator having a door, means forming a recess in the front surface of the door constituting an article compartment in the door adjacent to and accessible from the outside of the refrigerator while the door is closed, said compartment being warmed by the ambient medium at the outside of the door and cooled by the ambient medium at the inside of the refrigerator, and heat insulating means constituting a rear closure for said compartment for inhibiting but not preventing the conduction of heat from the compartment to the interior of the refrigerator.

2. In combination with a refrigerator having a door, means forming a recess in the front surface of the door constituting an article compartment in the door adjacent to and accessible from the outside of the refrigerator while the door is closed, said compartment being warmed by the ambient medium at the outside of the door and cooled by the ambient medium at the inside of the refrigerator, there being an opening between the compartment and the interior of the refrigerator for permitting the flow of cooling air from the interior of the refrigerator into said compartment, a closure for said opening, and means responsive to the temperature within the compartment for controlling the closure.

3. A refrigerator cabinet including a refrigerated compartment having a door, means forming a second compartment carried by the door and having at least one side thereof warmed by the ambient medium outside of the refrigerator cabinet whereby the temperature within the second compartment is between that inside the cabinet and that outside the cabinet, there being a communicating opening between the compartment and the interior of the cabinet for the flow of cooling air into the compartment, a closure for said opening, and thermostatically controlled means for controlling the closure.

4. In combination, a refrigerator box having a door for access into the box, a coin controlled vending machine mounted on the door of the refrigerator box, whereby the contents of the vending machine on the door of the box are maintained at a temperature between that on the inside of the box and that on the outside of the box, there being an opening in the door for permitting the flow of cooling air from the interior of the refrigerator box to the vending machine for cooling the contents thereof, a closure for said opening, thermostatically controlled means response to the temperature of the vending machine for controlling said closure, said vending machine having a coin receiving opening and a merchandise delivery opening both on the outside of the refrigerator box whereby commodities from the vending machine may be delivered from the refrigerator box while the door thereof remains closed.

5. In combination, a refrigerator box, a coin controlled vending machine mounted on the box and having a coin receiving opening and a merchandise delivery opening both on the outside of the box, said vending machine being warmed by the ambient medium on the outside of the box and cooled by the air inside of the box, heat insulation between the vending machine and the interior of the box whereby the contents of the vending machine are maintained at a temperature between that inside the box and that outside of the box, there being an opening in the box adjacent the vending machine for permitting cooling air from the box to flow to the vending machine, a closure for said opening, and thermostatically controlled means responsive to the temperature of the vending machine for controlling the closure.

6. In combination with a refrigerator having a door, means forming a recess in the front surface of the door constituting an article compartment in the door adjacent to and accessible from the outside of the refrigerator while the door is closed, said compartment being warmed by the ambient medium at the outside of the door and cooled by the ambient medium at the inside of the refrigerator, heat insulating means constituting a rear closure for said compartment for inhibiting but not preventing the conduction of heat from the compartment to the interior of the refrigerator, said heat insulating means being in an amount which is a substantial fractional part of the total effective thickness of the insulation of the refrigerator door, there being a communicating air passageway between the compartment and the interior of the refrigerator for permitting the flow of cooling air into the compartment, and variable means for controlling the flow of air through the passageway.

7. A refrigerator cabinet including a main refrigerating compartment and means forming a secondary compartment having one side thereof cooled by heat conduction with the main compartment, said one side being of insulation to inhibit but not entirely prevent the cooling of the second compartment by conduction of heat through said side to the main compartment, said second compartment having also at least one other side warmed by the ambient medium outside of the cabinet whereby the temperature within the secondary compartment is between that inside the cabinet and that outside the cabinet, an outer side of the secondary compartment opening on the outside of the cabinet to permit access to the secondary compartment while maintaining the main compartment substantially closed and means controlled by the temperature in the secondary compartment for increasing the rate at which the main compartment cools the secondary compartment.

8. Means for vending two types of commodities that require refrigeration to different temperatures which comprises, a refrigerator cabinet having a main refrigerator compartment for receiving one of the commodities and having a second compartment in a wall of the cabinet for receiving the other commodity, said compartments having outlets for discharging commodities therefrom to the outside of the cabinet, means for refrigerating the main compartment, said second compartment being cooled by the ambient medium of the first compartment and warmed by the outside atmosphere, and means for inhibiting the rate of cooling the second compartment whereby the temperature thereof is maintained above that of the main compartment and below that of the surrounding outside atmosphere, and means controlled by the temperature in the second compartment for increasing the rate at which the main compartment cools the second compartment.

9. In combination with a refrigerator having a door, means forming a recess in the front surface of the door constituting an article compartment in the door adjacent to and accessible from the outside of the refrigerator while the door is closed, said compartment being warmed by the ambient medium at the outside of the door and cooled by the ambient medium at the inside of the refrigerator, heat insulating means constituting a rear closure for said compartment for inhibiting but not preventing the conduction of heat from the compartment to the interior of the refrigerator, said heat insulating means being in an amount which is a substantial fractional part of the total effective thickness of the insulation of the refrigerator door, there being communicating air passageways between the compartment and the interior of the refrigerator near the top of the compartment and near the bottom of the compartment and out of vertical alignment with one another for permitting the circulation of cooling air through the compartment, and thermostatic controlled means for controlling the closing and opening of the passageways for controlling the circulation of cooling air through the compartment.

10. In combination with a refrigerator having a door, means forming a recess in the front surface of the door constituting an article compartment in the door adjacent to and accessible from the outside of the refrigerator while the door is closed, said compartment being warmed by the ambient medium at the outside of the door and cooled by the ambient medium at the inside of the refrigerator, there being an opening between the compartment and the interior of the refrigerator for permitting the flow of cooling air from the interior of the refrigerator into said compartment, a closure for said opening, and thermal responsive means controlling opening of the closure in response to a rise in temperature in the compartment above a predetermined value to thereby accelerate the cooling of the compartment.

11. A refrigerator cabinet including a refrigerated compartment having a door, means forming a second compartment carried by the door and having at least one side thereof warmed by the ambient medium outside of the refrigerator cabinet whereby the temperature within the second compartment is between that inside the cabinet and that outside the cabinet, there being a communicating opening between the compartment and the interior of the cabinet for the flow of cooling air into the compartment, a closure for said opening, and thermal responsive means for controlling the opening of the closure in response to a rise in temperature in the compartment above a predetermined value to thereby accelerate the cooling of the compartment.

12. In combination, a refrigerator box, a coin controlled vending machine mounted on the box, said vending machine being warmed by the ambient medium on the outside of the box and cooled by the air inside of the box, heat insulation between the vending machine and the interior of the box whereby the contents of the vending machine are maintained at a temperature above that inside the box, there being an opening in the heat insulation for permitting a direct transfer of air from the interior of the box into cooling relation to the vending machine, a closure for said opening, and thermal means responsive to the temperature of the vending machine for controlling opening of said closure to control the rate of cooling of the vending machine.

MILTON L. SMITH.